United States Patent [19]

Birdsall

[11] E Re. 30,454

[45] Reissued Dec. 23, 1980

[54] FLEXIBLE TRACK FOR ELECTRICALLY ENERGIZED MINIATURE VEHICLES

[76] Inventor: John D. Birdsall, 1262 Sunset Plaza Dr., Los Angeles, Calif. 90069

[21] Appl. No.: 19,340

[22] Filed: Mar. 12, 1979

Related U.S. Patent Documents

Reissue of:

[64] Patent No.: 4,095,743
Issued: Jun. 20, 1978
Appl. No.: 745,529
Filed: Nov. 29, 1976

U.S. Applications:

[63] Continuation-in-part of Ser. No. 652,071, Jan. 26, 1976, abandoned.

[51] Int. Cl.[3] ..... A63H 18/12; E01B 23/00

[52] U.S. Cl. ..... 238/10 F; 104/60; 104/305

[58] Field of Search ..... 238/10 R, 10 A, 10 B, 238/10 C, 10 E, 10 F, 166; 104/53, 60, 147 A, 149, DIG. 1, 245, 246, 247, 305; 46/1 K, 216, 257, 259; 406/40; 193/25 E; 198/850, 851; 273/86 B

[56] References Cited

U.S. PATENT DOCUMENTS

| | | | |
|---|---|---|---|
| 2,068,403 | 1/1937 | Ekstrom | 238/10 C |
| 3,223,327 | 12/1965 | Opfermann | 238/10 E |
| 3,414,194 | 12/1968 | Seitzinger et al. | 238/10 F |
| 3,750,945 | 8/1973 | Warr | 238/10 E |

FOREIGN PATENT DOCUMENTS

| | | | |
|---|---|---|---|
| 434298 | 9/1926 | Fed. Rep. of Germany | 238/10 R |
| 938296 | 1/1956 | Fed. Rep. of Germany | 238/10 E |
| 763528 | 5/1934 | France | 46/216 |
| 259485 | 9/1949 | Switzerland | 238/10 E |
| 489503 | 7/1938 | United Kingdom | 238/10 C |

*Primary Examiner*—Randolph A. Reese
*Attorney, Agent, or Firm*—Keith D. Beecher

[57] ABSTRACT

A flexible track or roadbed is provided for enabling miniature vehicles, such as toy cars, trains or the like, to be propelled along its length. The track in one embodiment is in the form of an elongated ribbon of flexible, electrically insulating rubber-like material, with serrations in each side thereof, to permit the track to be placed on any planar or non-planar supporting surface, with the track assuming vertical undulations corresponding to any undulations in the supporting surface, and to permit the track to be readily turned into any desired lateral curved, circular or tortuous shape, the track having one or more guide slots extending along the length of the track to guide the vehicles along the track, and a longitudinally extensible and compressible elongated electric element miniature vehicles propelled along the track. In the second embodiment the track is formed of a series of rigid articulated traverse elements intercoupled to one another.

18 Claims, 10 Drawing Figures

20
20A
20B
22
24
26
28
14
7
8

FLEXIBLE TRACK FOR ELECTRICALLY ENERGIZED MINIATURE VEHICLES

Matter enclosed in heavy brackets [ ] appears in the original patent but forms no part of this reissue specification; matter printed in italics indicates the additions made by reissue.

This application is a continuation-in-part of Copending Application Ser. No. 652,071 filed Jan. 26, 1976 now abandoned.

BACKGROUND OF THE INVENTION

Slot car racing toys are extremely popular at the present time. Such toys comprise a slotted track on which two or more electrically energized cars are guided, and which may be independently driven at controllable speeds. However, the track generally used in the prior art is usually made up of a multiplicity of interconnected track sections, and is relatively inflexible as to length and curvature. Also, the prior art track, for the most part, is subject to frequent failures at the track section junctions due to broken electrical contact, as the track sections are bent over irregular surfaces, or where the couplers between the track sections are not fully secured, or have broken off.

A principal object of the present invention is to provide an improved, simple and inexpensive track which does not require a planar roadbed; which may be readily formed to any desired length; and which may be easily set to any desired lateral curvature. The track to be described includes continuous electric conductors extending its entire length which do not have any tendency to break electrical contact as in the case with the multiple section tracks of the prior art.

Flexible track of the general type with which the present invention is concerned is known to the prior art. However, despite the claims of the proponents of the prior art flexible track, such track is actually incapable of being set to any lateral curved, circular or tortuous shape. This is because the electrical conductors embedded in the prior art flexible track, which are required to supply electrical energy to the vehicles propelled along the track, restrain and prevent any lateral curvature of the track itself.

The flexible track of the present invention, unlike the prior art track, in the preferred embodiment, incorporates elongated electric conductors which are longitudinally extensible and compressible, and which, for example, may taken the form of elongated coiled spring elements of electrically conductive resilient wire, or resilient electrically conductive material that may be compressed or extended (such as rubber-like material loaded with electrically conductive particles), or other forms to be described, so that the track assembly may be freely turned laterally to any desired curved, circular or tortuous shape.

DETAILED DESCRIPTION OF THE ILLUSTRATED EMBODIMENTS

Figure 1:
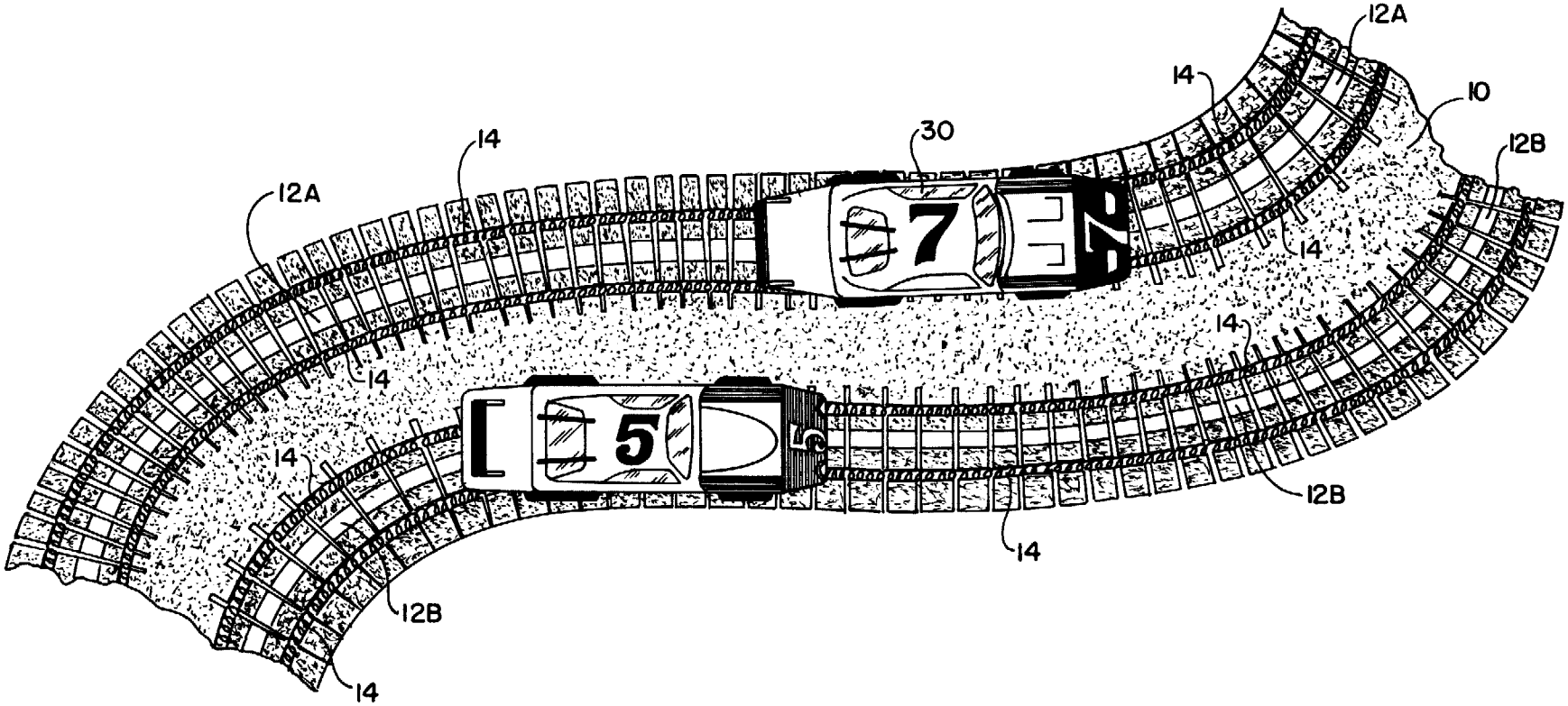
FIG. 1 is a plan view of a section of track incorporating the concepts of the present invention, and showing a pair of miniature cars on the track.

As shown in FIG. 1, for example, the track of the first embodiment of the present invention includes an elongated flat ribbon-like member 10 formed of rubber, vinyl or any appropriate electrically insulating rubber-like material. The elongated member 10, as shown is serrated at each edge to permit the elongated member to be turned laterally to any desired curvature.

A pair of guide slots 12A and 12B are formed in the elongated member 10, and extend along its length in spaced, parallel relationship. In the particular embodiment shown in FIG. 1, the slots intersect the serrations at each edge of the member 10.

Elongated electric elements 14 are provided on each side of the slots 12A and 12B. The elements 14 are mounted in the member 10 in corresponding channels, the channels being shaped to anchor the elements in place. The electric elements 14, as mentioned above, are longitudinally extensible and compressible, so as to permit the member 10 freely to be turned laterally to any desired curvature.

In the illustrated embodiment of FIGS. 1–4, the electricelements 14 are in the form of elongated coiled springs formed of any appropriate resilient electrically conductive wire. It is to be understood, of course, that although coil springs are shown in the illustrated embodiment of FIGS. 1–4, the electric elements 14 could have any other appropriate shape, some of which will be described subsequently herein, and which permits the individual elements freely to be extended or compressed in a longitudinal direction, so that the elements in no way interfere with the lateral turning of the member 10 to its desired curvature.

Figure 4:
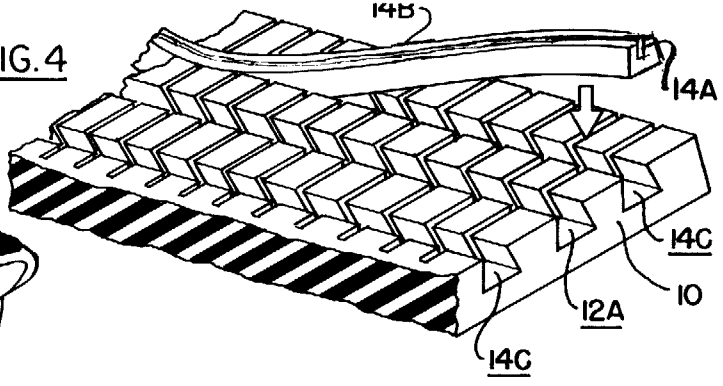
FIG. 4 is a perspective view of a section of the track showing a modified construction.

As one alternative, for example, and as shown in FIG. 4, the electric element may be in the form of an electrically conductive wire 14A, such as berylium copper, embedded in a rubber strip 14B, the latter being snapped into channels 14C, after the member 10 has been bent to the desired lateral configuration.

Figure 3:
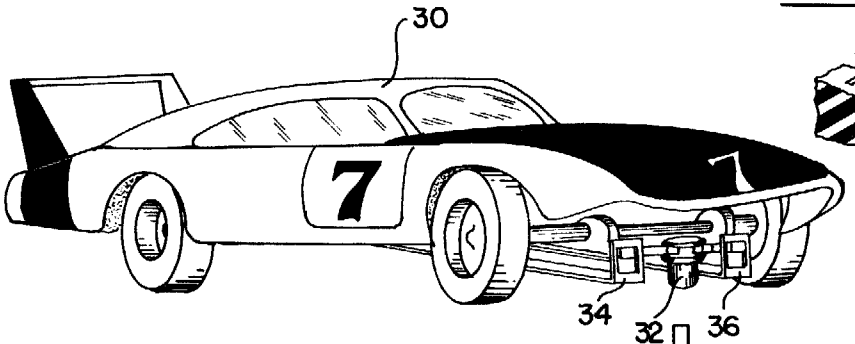
FIG. 3 is a schematic representation showing the configuration of the electric elements, and the manner in which the elements are energized.
Figure 3:
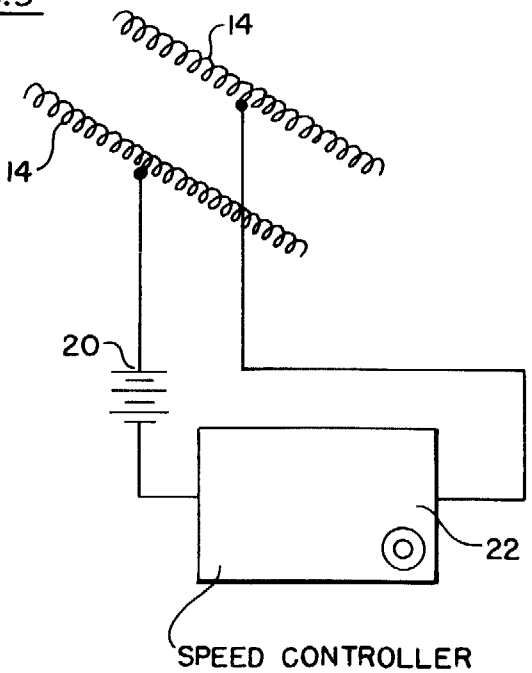

Each pair of electric elements 14 is energized, as shown schematically in FIG. 3 from an appropriate electrical energy source 20 through any suitable type of speed controller 22. This permits the vehicles guided by the individual slots 12A and 12B to be independently controlled, for example, for racing purposes. The electric contacts to each of the elements 14 may be made at the junction point as the track is formed into a closed loop. A pin may be fitted into one end of each element 14 to be received in the other end as the loop is formed. The electrical contact may then be made to the pin by welding or soldering the corresponding electric lead thereto.

Figure 2:
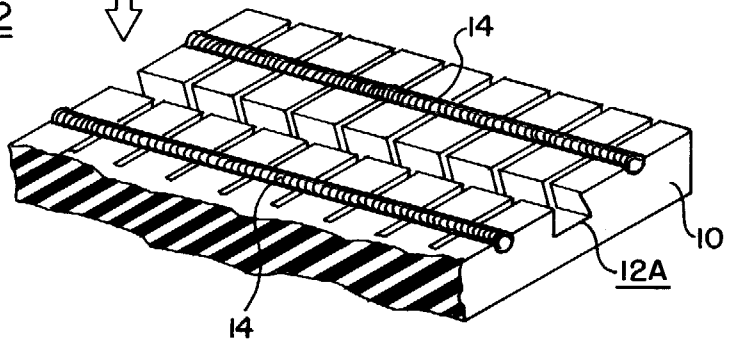
FIG. 2 is a perspective view of a fragmentary section of the track of FIG. 1, and showing clearly the manner in which the individual cars are electrically energized and guided along corresponding guide slots in the track.

As best shown in FIG. 2, a vehicle, such as a miniature car 30 has a guide element 32 which extends into the slot 12A or into the slot 12B of FIG. 1 so that the vehicle may be guided along the track. A pair of guide elements 32, for example, may be provided and may be rotatable about two vertical axes to minimize friction. The vehicle also includes a pair of electrical contacts 34 and 36 which slide along respective ones of the adjacent electric elements 14, so that propelling electric energy may be supplied to the vehicle 30 to propel the vehicle along the track.

Figures 5, 6, 7, 8, 9, 10:
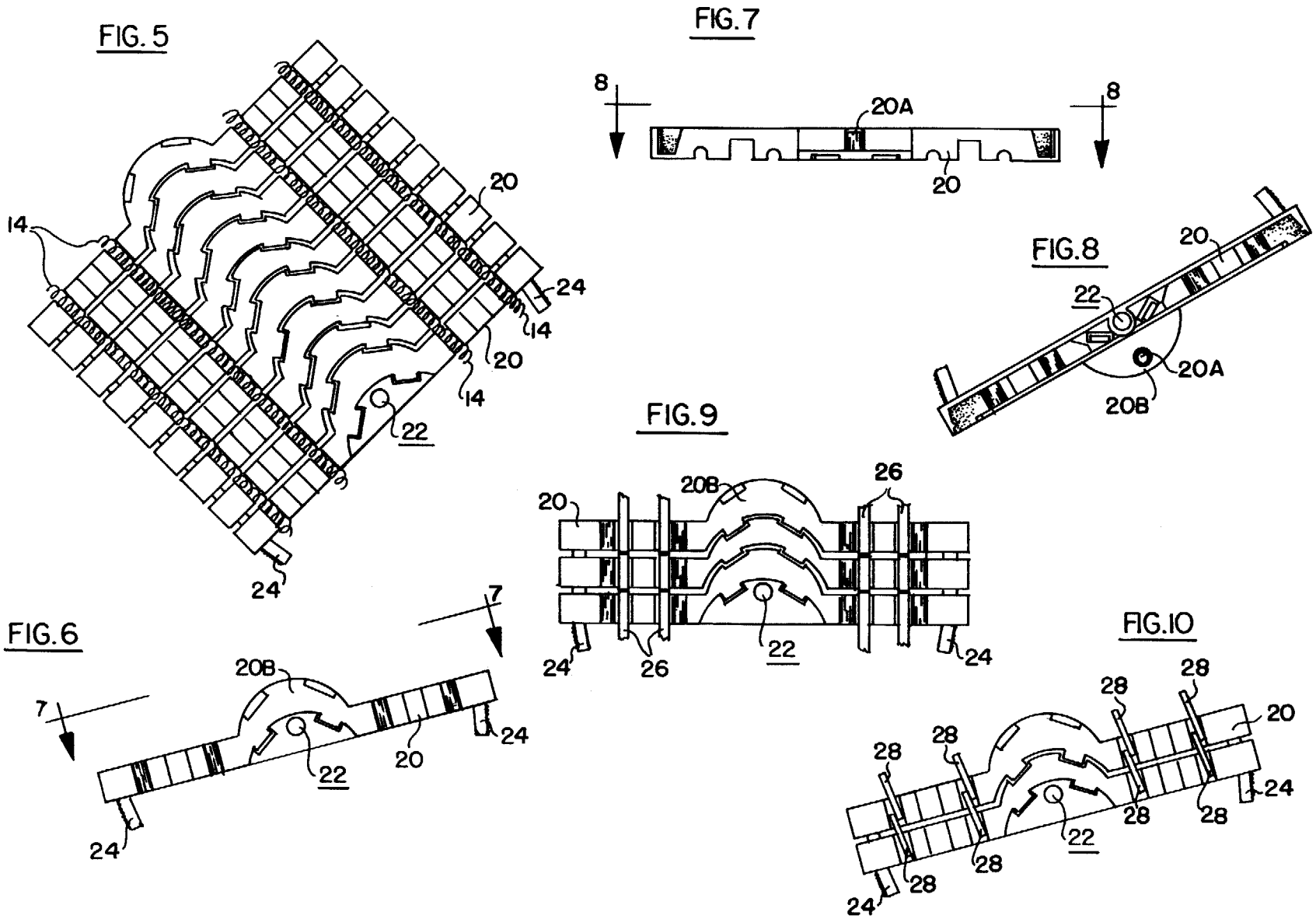
FIG. 5 is a perspective view of a fragmentary section of the track showing a further embodiment in which the track is formed of a series of rigid traverse elements intercoupled to one another.
FIG. 6 is a top plan view of one of the rigid traverse elements which make up the track of FIG. 5.
FIG. 7 is a side elevation of the traverse element of FIG. 6 taken along the line 7—7 of FIG. 6.
FIG. 8 is a side elevation of the traverse element of FIG. 7 taken along the line 8—8 of FIG. 7.
FIG. 9 is a top plan view of a fragmentary section of a track, similar to the track of FIG. 5, but incorporating modified electrically energizing elements.
FIG. 10 is a top plan view of a fragmentary section of the track of FIG. 5 incorporating yet a further type of electrically energizing elements.

In the embodiment of FIG. 5, the track is made up of a series of rigid elongated traverse elements 20 (FIG. 6) which may be formed of appropriate plastic material. Each of the traverse elements 20 has appropriate slots therein for receiving the electric elements 14. Each traverse element is coupled to an adjacent like element by means of an upstanding pin 20A which is received in a hole 22 in the adjacent element. Each traverse element has an arcuate section 20B with grooves therein and protuberances thereon, as shown, so as to limit the angular movement of the traverse elements with respect to one another. Each traverse element also has an integral projecting member 24 at each end, the projecting members being received in respective holes in the adjacent element so as to serve as end couplings for the element.

The embodiment of FIG. 5 has all the functional features of the embodiment of FIG. 1. The embodiment of FIG. 5 has an advantage in that it may be manufactured somewhat less expensively than the embodiment of FIG. 1, and the latter embodiment constitutes a more stable assembly. Also, the embodiment of FIG. 5 has individual parts which may be replaced should they become damaged.

The embodiment of FIG. 9 is similar to the embodiment of FIG. 5, except that the electric elements 14 have been replaced by electric elements 26. The electric elements 26 are formed of berylium copper, or other appropriate conductive material, coated on flexible strips formed, for example, of Mylar. The resulting strips of Mylar and berylium copper are then placed along the track sections as shown, and folded down between the individual traverse elements 20, so that the electric elements 26 may exhibit the desired extensible characteristics.

In the embodiment of FIG. 10, the electric elements are formed by individual electrically conductive clips 28 mounted on each of the traverse elements 20. The clips 28 are supported in grooves in the traverse elements so that when the traverse elements are intercoupled, the clips are brought into sliding electrical contact with one another. The latter embodiment has the advantage in that each traverse element is self-contained and may be removed and replaced more easily than the previous embodiments in which, the electric elements are continuous.

The invention provides, therefore, a flexible slotted track for guiding one or more miniature vehicles along any desired straight, curved, circular or tortuous path. As described, the track may also be supported on a non-planar surface to provide vertical undulations. The track has the ability of being turned laterally to any desired curved, circular or tortuous shape, and to be easily rolled up for storage purposes.

The track of the invention is simple and inexpensive to produce, and may be sold at a relatively low cost. The track of the first embodiment may be extruded or cut to any desired length. The track of the second embodiment may be formed to any desired length simply by coupling together a selected number of the traverse elements.

It will be appreciated that while particular embodiments of the invention have been shown and described, modifications may be made. It is intended in the claims to cover the modifications which come within the spirit and scope of the invention.

What is claimed is:

1. A track for miniature cars, trains, or the like, comprising: an elongated structure formed of a plurality of rigid traverse members each having a central hole therein and each having a central arcuate section shaped to nest with the central arcuate section of an adjacent like traverse member, each of said traverse members having an upstanding pin positioned to be received in the central hole of the adjacent like member, said track being capable of being turned laterally to curved configurations within predetermined limits, and at least one elongated electric element extending along the length of the elongated structure, said electric element being formed of electrically conductive material and being capable of substantial longitudinal extension and contraction.

2. The track defined in claim 1 in which each of said arcuate sections has grooves and protuberances thereon, with the protuberances on the arcuate section of one of the traverse members being received in the grooves in the arcuate section of an adjacent like traverse member so as to limit the angular movements of the traverse members with respect to one another.

3. The track defined in claim 1, in which each of said traverse members has projecting members at each end thereof to be received in corresponding holes in the ends of an adjacent like traverse member to serve as end couplings for the traverse members.

4. The track defined in claim 1, in which the electric element is in the form of an elongated coiled spring of electrically conductive resilient wire.

5. The track defined in claim 1, in which the electric element is in the form of a flexible electrically conductive strip folded down into the spaces between adjacent ones of the traverse members.

6. The track defined in claim 1, in which said elongated electric element is formed of a plurality of individual electrically conductive elements mounted on respective ones of the rigid traverse members and engaging one another in sliding electrical contact when the traverse members are intercoupled to one another.

*7. A track for miniature cars, trains, or the like, comprising: an elongated structure formed of a plurality of rigid transverse members, each of said transverse members including intermediate coupling means for coupling such transverse members to the next adjacent transverse member, said elongated structure being capable of being turned laterally to curved configurations within predetermined limits; at least one elongated electric element extending along the length of said elongated structure, said electric element being formed of electrically conductive material and being capable of substantial longitudinal extension*

*and contraction; each of said transverse members having integral longitudinally projecting members at each end thereof to be received in corresponding recesses in the ends of adjacent ones of said transverse members to serve as end couplings for the transverse members.*

*8. The track defined in claim 7, in which the electric element is in the form of an elongated coiled resilient spring of electrically conductive wire.*

*9. The track defined in claim 7, in which each of said transverse members has an integral upstanding pin on one side thereof and an integral socket in the other side thereof, the upstanding pin of each of the transverse members being positioned to be received in the socket of the next adjacent one of the transverse members the upstanding pins and integral sockets of the transverse members constituting said intermediate coupling means.*

*10. The track defined in claim 7, in which said intermediate coupling means for each of said transverse members comprises first and second central coupling portions, the first coupling portion of each transverse member being adapted for inter-engagement with the second coupling portion of an adjacent transverse member to permit limited pivotal movement of adjacent transverse members.*

*11. The track defined in claim 7, in which each of said transverse members is formed with a pair of spaced longitudinally extending channels in the top thereof each receiving one of the elongated electric elements.*

*12. The track defined in claim 11, in which each of said transverse members is formed with a longitudinally extending slot in the top thereof between said longitudinally extending channels.*

*13. The track defined in claim 7, in which said electrically conductive material is in the form of a coil.*

*14. The track defined in claim 7, in which each of said transverse members has a length laterally of the longitudinal axis of the track which is substantially greater than the width thereof.*

*15. The track defined in claim 7, in which each of said transverse members is formed with two pairs of spaced longitudinally extending channels in the top thereof one pair on each side of said intermediate coupling means each receiving one of the elongated electric elements.*

*16. The track defined in claim 15, in which each of said transverse members is formed with two longitudinally extending slots in the top thereof respectively disposed between the longitudinally extending channels of the two pairs.*

*17. A track for miniature cars, trains, or the like, comprising an elongated structure formed of a plurality of rigid transverse members each having first and second intermediate coupling portions, the first coupling portion of each transverse member being adapted for inter-engagement with the second coupling portion of an adjacent transverse member to permit limited relative pivotable movement of said adjacent transverse members for permitting said track to be turned laterally to curved configurations within predetermined limits, each of said transverse members being formed with at least one longitudinally extending slot in the top thereof and a pair of longitudinally extending channels in the top thereof on opposite sides of said slot; an electric element formed of a coil of electrically conductive material mounted in each of said channels, each coil being capable of substantial longitudinal expansion and contraction and in which each of said transverse members has integral longitudinally projecting members at each end thereof to be received in corresponding recesses in the ends of adjacent ones of said transverse members to serve as end couplings for the transverse members.*

*18. The track defined in claim 17, in which each of said transverse members is formed with two longitudinally extending slots in the top thereof one on each side of the intermediate coupling portions, and two pairs of longitudinally extending channels in the top thereof, with the channels of each pair respectively positioned on the opposite sides of the corresponding slot.*

* * * * *